Aug. 11, 1959 O. R. KREIMEIER 2,899,296
PROCESS FOR RECOVERING LEAD FROM BY-PRODUCT LEAD MATERIALS
Filed Nov. 15, 1957
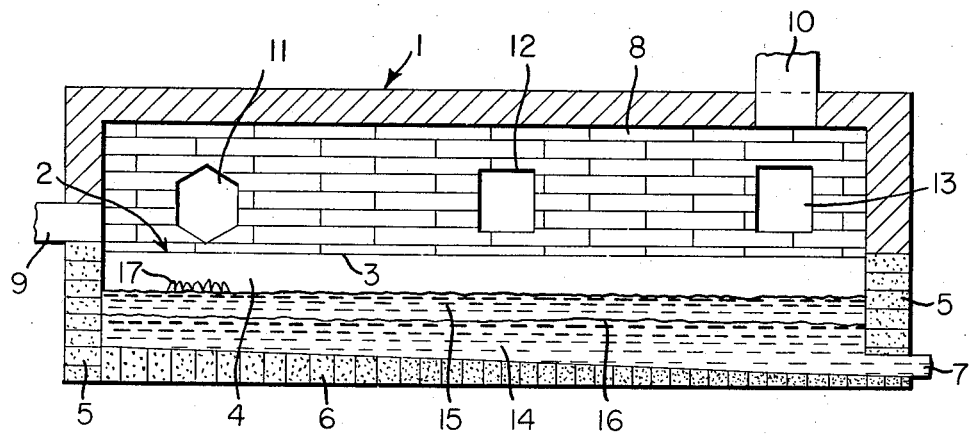
INVENTOR
OSCAR R. KREIMEIER
BY *Edwin C. Woodhouse*
ATTORNEY

United States Patent Office 2,899,296
Patented Aug. 11, 1959

2,899,296

PROCESS FOR RECOVERING LEAD FROM BY-PRODUCT LEAD MATERIALS

Oscar Robert Kreimeier, Salem, N.J., assignor to E. I. du Pont de Nemours and Company, Wilmington, Del., a corporation of Delaware Application November 15, 1957, Serial No. 696,686

9 Claims. (Cl. 75—77)

This invention relates to a process for recovering metallic lead from by-product lead materials of the character of those produced in the manufacture of tetraethyllead.

Tetraethyllead has been manufactured commercially for many years by reacting an excess of ethyl chloride with lead-monosodium alloy. In such reaction, the sodium in the alloy is mostly converted to sodium chloride, about 25% of the lead in the alloy is converted to tetraethyllead, and most of the rest of the lead in the alloy is converted to metallic lead in finely divided form. After the reaction has been completed, the excess ethyl chloride is distilled off, and the reaction mass is then drowned in water and the tetraethyllead removed by steam distillation in the presence of a still aid which largely prevents agglomeration of the finely-divided metallic lead particles. The still residue comprises a suspension of the by-product lead particles in a dilute solution of sodium chloride. This suspension is conveyed to a sludge pit where it is allowed to settle to form an upper layer of aqueous solution of salt and a lower layer of wet sludge which is composed mainly of the finely-divided lead mixed with about 8% to about 20% by weight of the aqueous salt solution. The water layer is drawn off and the wet sludge is washed with water to remove most of the salt and then dried to remove most of the water.

The resulting dried by-product lead sludge is impure, containing sodium chloride, lead chloride, sodium hydroxide and, in some cases, lead sulfate, lead sulfide and lead chromate (formed by reaction of the lead with the still aid), usually in a proportion of less than 1% by weight. In addition, the lead particles are coated with lead oxide. Usually, the lead oxide is present in a proportion of from about 2% to about 10% by weight, frequently as high as about 20% and, in extreme cases, as high as about 30%. It is possible, in some cases, to keep the amount of lead oxide down to 0.1–0.2% by weight. The byproduct lead sludge will sometimes contain iron salts, such as ferric chloride, ferric sulfate and iron sulfides, when an iron compound (usually ferric chloride) is employed as an ingredient of the still aid. By-product lead sludge of the above character is also produced in the production of other lead alkyls by similar reactions and in the production of tetraethyllead and like lead alkyls by other reactions.

The recovery of the lead in refined form from such impure by-product lead sludge has been difficult and has required a series of treatments which are inconvenient and costly. Usually, the impure by-product lead sludge has been refined by melting it in a reverberatory furnace at a temperature of from about 700° C. to about 900° C. to form an upper layer of slag and a lower lay of molten lead consisting of most of the metallic lead originally present in the impure by-product lead sludge. A temperature of at least 700° C. is required in the furnace to remove the lead oxide coating from the lead particles and release the molten metallic lead therefrom. The lower layer of molten lead is drawn off and cast in the form of pigs, a dross usually being formed during the casting and being recovered as skimmings. The slag and the dross are then further treated to recover their lead content.

The slag material is composed mainly of lead oxide, occluded lead, sodium chloride and minor proportions of other metal compounds such as lead chloride, sodium hydroxide, sodium carbonate, sodium plumbite, and ash residue and, sometimes, minor proportions of sodium sulfide, sodium dichromate, lead sulfide and iron salts. Such slag material is normally in the form of a high melting, highly viscous, pasty or solid mass which holds a material amount of metallic lead dispersed therein, the metal compounds therein preventing the dispersed molten lead particles from coalescing and passing into the lower layer of molten lead. When the impure by-product lead contains iron or iron compounds, they also appear in the slag, tending to concentrate as solid particles at the interface of the slag and the molten lead layers, interfering with the efficiency of contact between those layers and the passage of the molten lead from the slag layer into the molten lead layer. Heretofore, such slag materials have been shipped to another plant for reclamation of their lead content, usually by treatment with iron oxide, calcium carbonate and coke at high temperatures in a blast furnace.

Denison, in Patent No. 2,692,197, has disclosed a method of refining the impure by-product lead sludge by treating it with molten sodium hydroxide to form a lower layer of molten metallic lead and an upper layer of molten caustic containing the slag materials. The resulting mixture of caustic and slag materials must be further treated to recover the lead therefrom.

Larson, in Patent 2,691,575, discloses the treatment of lead oxide slag materials with fused sodium hydroxide and metallic sodium to reduce the lead oxide to metallic lead. While effective, such process, and the process of Denison, have the disadvantage that they cannot be operated practically in the existing conventional reverberatory furnaces because the fused caustic, particularly in the large amounts employed, severely and rapidly attacks the ceramic linings of the furnaces. The replacing of such linings with suitable alkali resistant materials is costly. Also, such processes require the use of considerable amounts of sodium hydroxide which are difficult to recover. Furthermore, in the process of Larson, it is difficult to convert all of the lead compounds to metallic lead.

It is an object of this invention to provide a new and improved process for recovering lead from by-product lead materials of the character of those produced in the manufacture of tetraethyllead. A particular object is to provide such a process for recovering lead from slag materials of such character. Another object is to provide such a process wherein substantially complete recovery of the lead in a highly purified condition is obtained by a single treatment. A further object is to provide such a process wherein the impurities are obtained substantially free of lead and other valuable materials so that they do not require further treatment to recover valuable materials and it is economical to throw them away. A still further object is to provide such a process which reduces the amounts of materials employed and the amount of handling required, with resulting economies and reductions in cost. Still another object is to advance the art. Other objects will appear hereinafter.

The above objects are accomplished by this invention which comprises heating by-product lead materials, which contain lead compounds and which are of the character of those obtained in the manufacture of tetraethyllead, at a temperature in the range of from about 400° C. to about 850° C. in the presence of a member of the group consisting of sodium cyanide, potassium cyanide, mixtures of sodium cyanide and potassium cyanide, and mixtures of any of said cyanides with a hydroxide of a corresponding alkali metal, the tempertaure being sufficient to maintain said member in a molten state and the alkali metal cyanide being present in a proportion corresponding to at least about 20% excess over that theoretically required to react with said lead compounds and convert them to metallic lead, and separating molten metallic lead from the reaction mixture.

It has been found that, under such conditions, the impure by-product lead materials, including the slag materials, are converted to mobile, fluid compositions from which the molten metallic lead settles readily in a highly purified condition, the alkali metal cyanide acts as a flux to strip oxide coatings from the lead particles, substantially all the lead compounds (chemically combined lead such as salts) are converted to metallic lead in molten form and the fluid compositions are caused to wet the molten lead and cause it to coalesce and settle from such compositions. There is formed a lower layer of highly purified molten lead, suitable for use in the manufacture of tetraethyllead and an upper layer of a fluid composition which is composed of the excess alkali cyanide, alkali hydroxide, sodium chloride, non-volatile reaction products (formed by the reaction of the alkali metal cyanide with the lead compounds and other metal compounds), and other unreacted impurities, but which is substantially free of lead and lead compounds. In the preferred forms of the invention, the resulting fluid composition is substantially free of economically recoverable valuable materials so that it can be thrown away. The use of conventional reducing agents, such as wood shavings, coke and carbons in general, have been found to be unsatisfactory in this process. Metallic lead, formed by the reduction of lead compounds by such conventional reducing agents, does not coalesce with the main body of molten lead but remains dispersed in the slag.

The impure by-product lead materials which may be treated by the process of this invention are those obtained in the manufacture of lead alkyls, particularly those obtained in the manufacture of tetraethyllead. Such materials include unrefined by-product lead sludge, slag materials obtained in the refining of by-product lead sludge, as by the reverberatory furnace method or by the method of Denison described in Patent 2,692,197, and dross obtained in the casting of refined by-product lead. The process of this invention is particularly designed and adapted for and is most efficiently employed in the treatment of slag materials, especially the slag materials produced in the reverberatory furnace. The treatment of such slag materials separately or as they are formed is preferred. Typical slag materials, obtained by the conventional processing of impure by-product lead sludge in a reverberatory furnace, consist essentially of 5–50% by weight of lead oxide, 2–30% by weight of lead chloride, 0.05–0.5% by weight of sodium plumbite, 0.1–5.0% by weight of sodium hydroxide, 0.1–5.0% by weight of sodium carbonate, 2–20% by weight of sodium chloride, about 1.0% by weight of residue ash from the fuel employed in the furnace, and up to about 50% by weight of small dispersed particles of metallic lead. The amount of sodium chloride will depend upon the extent to which it had been removed from the sludge by washing and may be absent. Also, if materials such as alkali metal sulfides, ferric chloride, or alkali metal dichromates are employed as still aids, other impurities such as lead sulfide, iron sulfide, sodium sulfide and corresponding metal dichromates may be present in small amounts.

It is also preferred to treat the impure by-product lead materials, containing no added sodium hydroxide, with pure or substantially pure (commercial) sodium cyanide at temperatures in the range of from about 550° C. to about 850° C., preferably from about 600° C. to about 800° C. Pure sodium cyanide melts at about 563° C. and commercial sodium cyanide melts slightly lower. Potassium cyanide, melting at about 634° C., is less preferred because of its cost and the higher minimum temperature required. Mixtures of sodium cyanide and potassium cyanide are desirable when it is desired to operate at lower temperatures, the utectic mixture (containing about 45% of NaCN) melts at about 500° C. Impurities in the impure by-product lead materials may mix with the alkali metal cyanide to further lower its melting point somewhat.

When it is desired to operate at still lower temperatures, such as from about 400° C. to about 500° C., mixtures of the alkali metal cyanide with large amounts of a hydroxide of the corresponding alkali metal may be used. The latter mixtures are formed when a caustic-slag composition, such as those obtained by the process of Denison in Patent No. 2,692,197, is treated with an alkali metal cyanide. When such large amounts of alkali metal hydroxide are used, the process will usually be carried out in vessels made of ordinary cast iron or sheet steel and the temperature preferably will not much exceed 500° C. so as to avoid the competing reaction between the cyanide and the caustic. Alternatively, the slag materials can be separated from the caustic-slag compositions of Denison by dissolving most of the caustic and other water-soluble materials with water, and then the slag materials can be treated with the alkali metal cyanide in a conventional reverberatory furnace. Dross, obtained in the casting of the lead, is preferably added to the dried sludge or to the slag materials and treated together with those materials.

The amount of alkali metal cyanide employed corresponds to at least about 20% excess over that theoretically required to react with the lead compounds (chemically combined lead such as lead oxide, lead chloride, etc.) present in the impure by-product lead materials and convert such lead compounds to metallic (elemental) lead, preferably from about 20% to about 25% excess. Materially smaller proportions of the cyanide fail to produce the desired results, i.e. to change the slag composition to a mobile, fluid mass, to act effectively as a flux in stripping the lead oxide coatings from the particles of lead, to convert substantially all the lead compounds to metallic lead, and to cause the fluid slag composition to effectively wet the molten metallic lead so that it will coalesce and pass through the slag composition and form a lower layer of purified molten metallic lead. When the impure by-product lead material is gradually fed to the cyanide-containing treating agent at process temperature, particularly when such process is operated continuously, the proportions of alkali metal cyanide may be materially greater than the 25% excess. Otherwise, materially more than a 25% excess of alkali metal cyanide will, in general, be uneconomical in that it will constitute a waste of valuable alkali metal cyanide and present disposal problems. Normally, the preferred amounts of alkali metal cyanide vary from about 5% to about 25% by weight based on the slag material, exclusive of occluded (dispersed) metallic lead. This variation is determined primarily by the amount of lead oxide in the impure by-product lead materials.

The process may be carried out batchwise or continuously in melt pots, vessels or equipment made of materials which are resistant to attack by the reactants employed and the reaction products employed. The process, in its preferred embodiments, is particularly adapted for operation, preferably in a continuous manner, in the ceramic-lined reverberatory furnaces conventionally employed for recovering unreacted lead from the dried lead sludges. The order of adding and mixing the reactants is not critical except when the impure lead materials contain sulfur compound. When a simple batch kettle is used, the alkali metal cyanide treating agent may be added to the impure by-product lead material, the treating agent and the impure lead material may be fed to the kettle simultaneously, or the by-product lead material may be added to the treating agent. The vessel may be at the process temperature during the addition of the reactants thereto, or it may be at atmospheric temperature and then heated after the addition of the reactants. Mixing is facilitated by agitation. After the reactants are mixed, agitation is unnecessary, but usually will be desirable in large scale operations to improve heat transfer and to insure better physical contact between the reactants.

Generally, anhydrous alkali metal cyanide will be preferred. However, aqueous alkali metal cyanide may be mixed with the impure by-product lead material and the mixture heated to first drive off the water and then heated further to melt and refine the lead material. However, the water preferably is removed before the impure lead material is added thereto. In one procedure, the alkali metal cyanide is heated to the desired process temperature to form a body of molten cyanide, and then the impure lead material is fed gradually, in increments or continuously, to the top of the molten cyanide with mild stirring. Desirably, a substantial body of refined molten lead is accumulated and maintained beneath the body of molten cyanide, and portions thereof withdrawn intermittently or continuously, at the same time replacing all or portions of the cyanide layer intermittently or continuously as it becomes depleted in cyanide content. In such a continuous process, it is preferred to mildly stir the layer of molten cyanide and the layer of molten lead separately so that mixing takes place only at the interface of the layers. The layer of molten cyanide-containing treating agent protects the molten lead from oxidation and, therefore, it is not necessary to employ an atmosphere of inert gas to exclude an oxygen-containing atmosphere such as air. When impure by-product lead sludge which contains more than 0.5% by weight of tetraethyllead is to be treated, it is desirable, in order to prevent decomposition of the tetraethyllead, to maintain flash distillation conditions, as by feeding the sludge slowly to the molten cyanide-containing agent and applying vacuum to remove the tetraethyllead as fast as it is vaporized.

In another procedure, the impure by-product lead material is first heated to the desired process temperature and then the cyanide-containing agent is added to such material, preferably in solid form. This procedure is preferred, particularly when the impure lead material contains lead sulfide. Lead sulfide is not effectively converted to metallic lead by the cyanide. However, by first heating the impure lead material to the process temperature, the lead sulfide is eliminated by rapid reaction with part of the lead oxide to form metallic lead and oxides of sulfur. Once the lead sulfide has been eliminated, the addition of the cyanide-containing agent is effective to convert the rest of the lead compounds to metallic lead. Alternatively, the lead sulfide may be converted to metallic lead, in the presence of the cyanide-containing agent, by the addition of a reducing agent for the lead sulfide, such as calcium carbide.

One form of a suitable reverberatory furnace for carrying out the process of this invention and a preferred mode of operation are illustrated diagrammatically in the accompanying drawing which is a side view in cross-section of the furnace and its contents. The furnace is indicated generally by the numeral 1. The bottom of the furnace constitutes a pan 2 which is open at the top 3 and has side walls 4 and end walls 5, all lined with soapstone, and a floor 6 of fire brick. The floor is slightly sloped toward a tap 7 at the discharge end of the furnace for withdrawing molten lead. The furnace, above the pan, is lined with mullite brick 8.

At the feed end of the furnace, just above the top of the pan, there is provided an opening 9 to admit a jet of flame from an oil-burner (not shown). Near the discharge end of the furnace, there is a flue or chimney 10 for egress of combustion gases, volatile reaction products, etc. Three doors 11, 12 and 13 are provided in the side wall of the furnace above the top of the pan. Door 11 is a feed door for the impure by-product lead material and the cyanide-containing treating materials. Door 12 is provided for both observation and alternate or supplementary feed of treating materials. Door 13 is for removing slag. Hatches may be placed in the roof in place of or supplementary to any one or more of doors 11, 12 and 13.

In operation, the impure by-product lead material is fed into the furnace through door 11. A jet of flame is passed through the opening 9 and extends about ⅓ of the way down the furnace, heating and melting the impure lead material which flows toward the tap 7 and forms two layers comprising a lower layer 14 of molten lead and an upper layer 15 of slag, the lead-slag interface being indicated at 16. The temperature in the furnace preferably is in the range of about 650° C. to about 800° C. Alkali metal cyanide is added through door 11, admixed with the impure lead material or dropped onto and distributed over the charge as evenly as practical, the cyanide, in the form of "eggs," being indicated at 17. It is not necessary for the cyanide to completely cover the slag for its entire length, but is essential that it be added in at least the required minimum amount. The cyanide, when dropped onto the charge, rests momentarily on the surface of the charge but is melted by the heat of the flame and by the heat of its reaction with constituents of the slag, spreading over the surface of the slag and then mixing with the bulk of the slag, where it exerts its effects of converting the slag materials to a mobile fluid mass, removing the lead oxide coating from the lead particles, converting the lead compounds to metallic lead [in turn being converted largely into the corresponding alkali metal cyanate (NaOCN)], causing the fluid slag composition to wet the metallic lead, and causing the molten metallic lead to coalesce and pass through the liquefied slag layer down into the molten lead layer 14. The combustion gases from the flame and any volatile products, such as traces of water originally present in the feed and other products of reaction and possibly products of decomposition of the cyanate, e.g., ammonia, discharge through the flue 10. As the charge flows toward the discharge end of the furnace, additional impure lead material and cyanide is fed into the furnace through door 11. The molten lead is periodically or continuously withdrawn through the tap 7 and the cyanide-slag composition is periodically or continuously removed through door 13.

It is sometimes desirable to add the cyanide to the charge at a point further removed from the feed end of the furnace than door 11, as when it is necessary to first remove volatile materials, such as water and tetraethyllead, from the impure lead material or when the impure lead material contains lead sulfide. This is particularly desirable, when the impure lead material contains lead sulfide, so as to permit the lead sulfide to react with lead oxide before contact with the cyanide. In such case, the cyanide is added through door 12 which usually is about half-way down the length of the furnace. The rate of the reaction between the lead sulfide and lead oxide and the time for completing the reaction depends upon the temperature, intimacy of contact of the lead oxide of the slag with the lead sulfide of both the slag and the molten lead layers, and the presence in the charge of iron sulfide which tends to concentrate as solid particles along the slag/lead interface 16 and apparently interfere with the efficiency of contact. It is usually sufficient to have the reaction proceed so as to eliminate most of the lead sulfide, complete elimination thereof ordinarily being impractical, particularly when iron sulfide is present.

By this procedure, the lead values in the impure by-product lead material are recovered substantially completely in one step in the reverberatory furnace; that is, it produces a slag which is substantially free of lead, either metallic or chemically combined, and which can be disposed of economically as waste.

In order to more clearly illustrate this invention, preferred modes of practicing it, and the advantages results to be obtained thereby, the following examples are given, in which the parts and proportions of materials are by weight except where otherwise specifically indicated:

Example 1

2500 parts of cold slag (which had been recovered from the reverberatory furnaces in the processing of impure by-product lead from the manufacture of tetraethyllead) was added gradually in 3.5 hours to a steel pot containing 300 parts of molten commercial sodium cyanide which was at least 96% pure and melted at 560° C. The addition of the cold slag to the hot cyanide rendered temperature control somewhat difficult and the temperature varied from a low of about 550° C. to a high of about 650° C. during the addition of the slag. Reaction occurred at 550° C., as evidenced by the liberation of gaseous material and the appearance of globules of free lead on the surface of the molten cyanide layer. When the reaction was complete and the lead globules had settled, the molten lead which had accumulated at the bottom of the pot was cast into pigs totalling 1740 parts. The cyanide slag layer was found to be substantially free of combined lead. The recovered lead was satisfactory for conversion, by way of its alloys with sodium, into tetraethyllead.

Example 2

A plant oil-fired reverberatory furnace (illustrated in the drawing) was operated in the conventional manner. Impure by-product lead sludge (from the manufacture of tetraethyllead) was fed to the furnace and heated to about 800° C. to produce a mass of molten lead topped by the usual layer of slag which amounted to about 2.3% by weight of the impure by-product lead sludge charged to the furnace and contained about 30–40% of chemically bound lead. Sodium cyanide (eggs), in portions, was added and distributed as evenly as possible from the feed end to about half-way down to the discharge end of the furnace. The sodium cyanide melted and mixed with the layer of slag materials which were then periodically sampled (e.g. by spooning) and tested for the presence of chemically bound lead. At the end of 8 hours, a total of 600 pounds of sodium cyanide had been added to the slag materials which had accumulated from the melting of about 135,000 pounds of by-product lead sludge, and the slag layer had become molten and contained substantially no chemically bound lead (i.e. less than 1%). The slag layer was removed and the molten lead was cast into hogs totalling 131,000 pounds of reusable lead. In addition, 700 pounds of dross were recovered as skimmings from the cast hogs. Said dross consisted essentially of about 85% of metallic lead, about 15% of lead sulfide and about 0.01% of iron compounds, the lead sulfide and the iron compounds being derived from still aids. In the conventional process, i.e. when alkali metal cyanide is not employed, the recovered dross generally is about 900 pounds. Thus the process of this invention affords savings in terms of the smaller quantities of dross that require further processing for the recovery of its lead, as well as the major advantage of directly recovering the chemically combined lead as substantially pure molten lead. The lead values in the dross from the cast hogs are recoverable as illustrated in Example 3.

Example 3

3690 parts of dross, of the composition of that obtained in the casting of lead as described in Example 2, was added to a steel melt pot containing 150 parts of sodium cyanide held at 600° C. Next, 100 parts of finely ground calcium carbide was added and the mass held at 600° C. for one hour. The lower layer of molten metal was drawn off and cast into pigs of pure (i.e. 99.9+%) lead weighing 3060 parts. The recovered upper slag layer was found to be free of lead sulfide.

Instead of recovering the lead from the dross in a separate step as described above, the dross can be returned to the reverberatory furnace and added to the by-product lead sludge or to the normal slag materials where it is allowed to react with lead oxide in the slag materials before the sodium cyanide is added thereto.

Example 4

Infusible slag material was taken by random sampling of the normal slag which had been separated from the molten lead in the treatment of lead sludge in a conventional reverberatory furnace, said material having an unusually low lead content. 325 grams of sodium hydroxide was heated in a steel pot to melting at 325–335° C., and 75 grams of sodium cyanide were added, forming a completely molten homogeneous mass. To such molten mass, there was added 203 grams of the above slag material and the mixture held at 325–340° C. for 20 hours during which time free lead appeared and nearly all of the slag material became liquefied. The mixture was then heated to 400° C., whereupon the slag material was completely liquefied and a lower layer of molten metallic lead was formed. The molten upper layer was then skimmed off and the molten lead layer was cast to a button weighing 43.5 grams. The upper layer was found by analysis to be free of lead. Thus, the recovery of lead from the infusible slag material was judged to be complete.

Example 5

A mixture of sodium hydroxide and slag materials (obtained by the process of Denison in Patent 2,692,197) contained about 50–53% by weight of slag materials insoluble in the caustic. Most of the insoluble slag materials were considered to be lead oxide. 175 grams of this mixture was added in portions to 100 grams of sodium cyanide held at 600° C. in a steel pot. Globules of molten metallic lead began to form almost immediately, settling in a pool. After all the caustic-slag mixture had been added, the mixture was held at 600° C. for 15 minutes and then allowed to cool. The caustic and the other water-soluble substances were dissolved away by treating the reaction mass with an excess of water, leaving a button of metallic lead weighing 69.5 grams. The theoretical quantity of recoverable lead in the caustic-slag mixture was calculated to be about 77 grams. While it is known that fused mixtures of sodium hydroxide and sodium cyanide react with each other at 500° C., the above results indicate that the reactions of the present process are favored over the possible competing reactions at temperatures up to 600° C. at least.

It will be understood that the foregoing examples, and the apparatus and process shown and described in connection with the drawing, are given for illustrative purposes solely and that this invention is not limited to the specific embodiments disclosed therein. On the other hand, it will be apparent to those skilled in the art that, within the limits set forth in the general description, the materials, proportions, equipment, conditions and procedures may be widely varied without departing from the spirit and scope of this invention.

From the preceding description it is apparent that this invention provides a novel process for effectively recovering the lead in a satisfactorily refined form from the impure by-product lead materials which are of the character of those produced in the manufacture of tetraethyllead. Particularly and preferably, this invention provides such a process whereby such results are obtained by a single treatment of the impure lead materials. The process is simple, readily operated and controlled, and results in material economies over the conventional procedures employed heretofore. Accordingly, it will be obvious that this invention constitutes a valuable advance in, and contribution to the art.

The embodiments of the invention in which an exclusive property or privilege is claimed are defined as follows:

1. The process for recovering metallic lead from by-product lead materials which contain lead compounds and which are of the character of those obtained in the manufacture of tetraethyllead, which process comprises heating said by-product lead materials at a temperature in the range of from about 400° C. to about 850° C. in the presence of a member of the group consisting of sodium cyanide, potassium cyanide, mixtures of sodium cyanide and potassium cyanide, and mixtures of any of said cyanides with a hydroxide of a corresponding alkali metal, the temperature being sufficient to maintain said member in a molten state and the alkali metal cyanide being present in a proportion corresponding to at least about 20% excess over that theoretically required to react with said lead compounds and convert them to metallic lead, and separating molten metallic lead from the reaction mixture.

2. The process for recovering metallic lead from by-product lead materials which contain lead compounds and which are of the character of those obtained in the manufacture of tetraethyllead, which process comprises heating said by-product lead materials at a temperature in the range of from about 400° C. to about 850° C. in the presence of a member of the group consisting of sodium cyanide, potassium cyanide, mixtures of sodium cyanide and potassium cyanide, and mixtures of any of said cyanides with a hydroxide of a corresponding alkali metal, the temperature being sufficient to maintain said member in a molten state and the alkali metal cyanide being present in a proportion corresponding to from about 20% to about 25% excess over that theoretically required to react with said lead compounds and convert them to metallic lead, and separating molten metallic lead from the reaction mixture.

3. The process for recovering metallic lead from by-product lead materials which contain lead compounds and which are of the character of those obtained in the manufacture of tetraethyllead, which process comprises heating said by-product lead materials at a temperature in the range of from about 550° C. to about 850° C. in the presence of sodium cyanide, the temperature being sufficient to maintain the sodium cyanide in a molten state and the sodium cyanide being present in a proportion corresponding to at least about 20% excess over that theoretically required to react with said lead compounds and convert them to metallic lead, and separating molten metallic lead from the reaction mixture.

4. The process for recovering metallic lead from slag materials which contain lead compounds and which are obtained in the refining of impure by-product lead produced in the manufacture of tetraethyllead, which process comprises heating said slag materials at a temperature in the range of from about 400° C. to about 850° C. in the presence of a member of the group consisting of sodium cyanide, potassium cyanide, mixtures of sodium cyanide and potassium cyanide, and mixtures of any of said cyanides with a hydroxide of a corersponding alkali metal, the temperature being sufficient to maintain said member in a molten state and the alkali metal cyanide being present in a proportion corresponding to at least about 20% excess over that theoretically required to react with the lead compounds and convert them to metallic lead, and separating molten metallic lead from the reaction mixture.

5. The process for recovering metallic lead from slag materials which contain lead compounds and which are obtained in the refining of impure by-product lead produced in the manufacture of tetraethyllead, which process comprises heating said slag materials at a temperature in the range of from about 550° C. to about 850° C. in the presence of sodium cyanide, the temperature being sufficient to maintain the sodium cyanide in a molten state and the sodium cyanide being present in a proportion corresponding to from about 20% to about 25% excess over that theoretically required to react with said lead compounds and convert them to metallic lead, and separating molten metallic lead from the reaction mixture.

6. The process for recovering metallic lead from by-product lead materials which contain lead oxide, lead sulfide and other lead compounds, and which are of the character of those obtained in the manufacture of tetraethyllead, which process comprises heating said by-product lead materials at a temperature in the range of from about 400° C. to about 850° C. until the lead sulfide is largely eliminated by reaction with the lead oxide, then adding to the hot material a member of the group consisting of sodium cyanide, potassium cyanide, mixtures of sodium cyanide and potassium cyanide, and mixtures of any of said cyanides with a hydroxide of a corresponding alkali metal, while maintaining the temperature in said range and sufficiently high to maintain said member in a molten state, the alkali metal cyanide being present in a proportion corresponding to at least about 20% excess over that theoretically required to react with the remaining lead compounds and convert them to metallic lead, and separating molten metallic lead from the reaction mixture.

7. The process for recovering metallic lead from by-product lead materials which contain lead oxide, lead sulfide and other lead compounds, and which are of the character of those obtained in the manufacture of tetraethyllead, which process comprises heating said by-product lead materials at a temperature in the range of from about 550° C. to about 850° C. until the lead sulfide is largely eliminated by reaction with the lead oxide, then adding to the hot material sodium cyanide in a proportion corresponding to from about 20% to about 25% excess over that theoretically required to react with the remaining lead compounds and convert them to metallic lead, while maintaining the temperature in said range and sufficiently high to maintain the sodium cyanide in a molten state, and separating molten metallic lead from the reaction mixture.

8. The process for recovering metallic lead from slag materials which contain lead oxide, lead sulfide and other lead compounds, and which are of the character of those obtained in the refining of by-product lead produced in the manufacture of tetraethyllead, which process comprises heating said slag materials at a temperature in the range of from about 400° C. to about 850° C. until the lead sulfide is largely eliminated by reaction with the lead oxide, then adding to the hot material a member of the group consisting of sodium cyanide, potassium cyanide, mixtures of sodium cyanide and potassium cyanide, and mixtures of any of said cyanides with a hydroxide of a corresponding alkali metal, while maintaining the temperature in said range and sufficiently high to maintain said member in a molten state, the alkali metal cyanide being present in a proportion corresponding to from about 20% to about 25% excess over that theoretically required to react with the remaining lead compounds and convert them to metallic lead, and separating molten metallic lead from the reaction mixture.

9. The process for recovering metallic lead from slag materials which contain lead oxide, lead sulfide and other lead compounds, and which are of the character of those obtained in the refining of by-product lead produced in the manufacture of tetraethyllead, which process comprises heating said slag materials at a temperature in the range of from about 550° C. to about 850° C. until the lead sulfide is largely eliminated by reaction with the lead oxide, then adding to the hot material sodium cyanide in a proportion corresponding to from about 20% to about 25% excess over that theoretically required to react with the remaining lead compounds and convert them to metallic lead, while maintaining the temperature in said range and sufficiently high to maintain the sodium cyanide in a molten state, and separating molten metallic lead from the reaction mixture.

References Cited in the file of this patent

UNITED STATES PATENTS 890,160   Morrison _____ June 9, 1908